(12) United States Patent
Garrick et al.

(10) Patent No.: US 7,665,935 B1
(45) Date of Patent: Feb. 23, 2010

(54) CARBIDE DRILL BIT FOR COMPOSITE MATERIALS

(75) Inventors: Richard M. Garrick, Woodland Hills, UT (US); John A. Bunting, Provo, UT (US)

(73) Assignee: Precorp, Inc., Spanish Fork, UT (US)

( * ) Notice: Subject to any disclaimer, the term of this patent is extended or adjusted under 35 U.S.C. 154(b) by 659 days.

(21) Appl. No.: 11/494,213

(22) Filed: Jul. 27, 2006

(51) Int. Cl.
*B23B 51/02* (2006.01)

(52) U.S. Cl. ........................ 408/227; 408/230

(58) Field of Classification Search ............... 408/227, 408/223–225, 229, 230; *B23B 51/00, 51/02*
See application file for complete search history.

(56) References Cited

U.S. PATENT DOCUMENTS

| | | | |
|---|---|---|---|
| 1,747,117 A | 2/1930 | Klein | |
| 2,332,295 A | 10/1943 | Bouchal | |
| 2,334,845 A * | 11/1943 | Schwartz | 408/224 |
| 3,346,894 A | 10/1967 | Lemelson | |
| 3,387,511 A | 6/1968 | Ackart, Sr. et al. | |
| 3,779,664 A | 12/1973 | Caley et al. | |
| 4,093,395 A | 6/1978 | Luebbert et al. | |
| 4,480,952 A | 11/1984 | Jeremias | |
| 4,527,643 A | 7/1985 | Horton et al. | |
| 4,529,341 A | 7/1985 | Greene | |
| 4,572,714 A * | 2/1986 | Suzuki et al. | 408/230 |
| 4,627,503 A | 12/1986 | Horton | |
| 4,713,286 A | 12/1987 | Bunting et al. | |
| 4,720,218 A | 1/1988 | DeFries et al. | |
| 4,762,445 A | 8/1988 | Bunting et al. | |
| 4,898,503 A | 2/1990 | Barish | |
| 5,173,014 A | 12/1992 | Agapiou et al. | |
| 5,195,403 A | 3/1993 | Sani et al. | |
| 5,197,233 A | 3/1993 | Wiand | |
| 5,217,332 A | 6/1993 | Takasaki et al. | |
| 5,273,380 A | 12/1993 | Musacchia | |
| 5,354,155 A | 10/1994 | Adams | |
| 5,443,337 A | 8/1995 | Katayama | |
| 5,570,978 A | 11/1996 | Rees et al. | |

(Continued)

FOREIGN PATENT DOCUMENTS

EP 0 137 898 4/1985

(Continued)

OTHER PUBLICATIONS

"Metal Cutting Tool Handbook," United States Cutting Tool Institute by Industrial Press Inc., Seventh Edition, pp. 276-281.

(Continued)

*Primary Examiner*—Daniel W Howell
(74) *Attorney, Agent, or Firm*—Madson IP, P.C.

(57) ABSTRACT

A drill bit for producing holes in composite materials is disclosed. The drill bit includes an elongate drill bit body having a drill bit diameter. The drill bit also includes at least two helical flutes. The helical flutes have a reverse helix angle and a primary cutting edge. The primary cutting edge may have a positive rake angle. The drill bit further includes a point having a point length. The drill bit may also include a cutting tip with a tip angle and a tip length. The tip length is at least twice the drill bit diameter.

19 Claims, 7 Drawing Sheets

U.S. PATENT DOCUMENTS

| | | | |
|---|---|---|---|
| 5,611,251 A | | 3/1997 | Katayama |
| 5,641,252 A | | 6/1997 | Eriksson et al. |
| 5,649,796 A | | 7/1997 | Durney |
| 5,685,673 A | * | 11/1997 | Jarvis ............... 408/230 |
| 5,788,431 A | * | 8/1998 | Basteck ............ 408/229 |
| 5,816,755 A | | 10/1998 | Thelin |
| 5,931,615 A | | 8/1999 | Wiker |
| 6,029,544 A | | 2/2000 | Katayama |
| 6,030,156 A | | 2/2000 | Andronica |
| 6,126,367 A | | 10/2000 | Reed |
| 6,132,148 A | | 10/2000 | Thompson |
| 6,261,034 B1 | * | 7/2001 | Cselle ............... 408/230 |
| 6,315,504 B1 | | 11/2001 | Sekiguchi et al. |
| 6,923,602 B2 | | 8/2005 | Osawa et al. |
| 6,964,546 B1 | * | 11/2005 | Vakil ............... 408/110 |
| 7,367,758 B2 | | 5/2008 | Turrini et al. |
| 2003/0202853 A1 | | 10/2003 | Ko et al. |
| 2005/0135889 A1 | | 6/2005 | Turrini et al. |
| 2006/0269372 A1 | | 11/2006 | Goshima |

FOREIGN PATENT DOCUMENTS

| | | | | |
|---|---|---|---|---|
| JP | 02237710 A | * | 9/1990 | |
| JP | 02237711 A | * | 9/1990 | |
| JP | 02237712 A | * | 9/1990 | |
| JP | 09057515 | | 3/1997 | |
| JP | 2000-061720 | | 2/2000 | |
| JP | 2001-341019 | | 12/2001 | |
| JP | 2004-017238 | | 1/2004 | |
| JP | 2006-192510 | | 7/2006 | |
| WO | WO 9731741 A1 | * | 9/1997 | |
| WO | WO 2004/082874 A1 | | 9/2004 | |

OTHER PUBLICATIONS

B. Barton, "Piloted Helical Fluted Reamer," Bell Helicopter Textron, Cutting Tool Engineering, Jun. 2, 1988, pp. 1.

"Drill/Reamer Point & Flute Configuration," Boeing Tool Drawing, Sep. 20, 1978, pp. 1.

* cited by examiner

CARBIDE DRILL BIT FOR COMPOSITE MATERIALS

TECHNICAL FIELD

The present invention relates generally to drills and drill bits. More specifically, the present invention relates to carbide drill bits for composite materials.

BACKGROUND

Multi-layer laminates such as carbon fiber-reinforced composites (CFRP) and fiberglass composites (FRP) are widely used in a large number of applications. These laminate materials most often consist of woven layers of strong fibers that are often coated with resins and processed or cured to form a solid structure. Depending on the choice of the fiber and the resin systems used, these materials can be formulated and molded to produce components with excellent mechanical properties and unique geometries that would be difficult or impossible to obtain using other materials.

The properties of high strength CFRP materials may be widely varied by manipulating the characteristics of the matrix formulation, as well as the fiber type, content, orientation, buildup, and the methods used to shape these materials into a finished structure. This variability and the general strength of the CFRP materials make them useful in a wide variety of applications, ranging from bicycle frames to aircraft structures.

The reinforcing fiber most widely used in aircraft structures is a carbon fiber produced by the thermal decomposition of polyacrylonitrile (PAN). Such thermal decomposition coverts the PAN fiber to a pure carbon fiber that is highly abrasive and very strong. In some specific examples, such carbon fibers are reported to have tensile strengths of about 800,000 psi and a modulus of about 40 million psi. Such carbon fiber materials are produced by a number of companies such as Toray, Toho Tenax, Cytec, Hexcel, and Mitsubishi Rayon.

In producing structures such as aircraft components, these high-strength fibers typically are first woven into thin sheets and combined with resins to form flat sheets of composite referred to as "prepregs". Components such as composite skin sections of aircraft may be produced by placing multiple layers of such prepregs in molds and then using pressure and heat to shape and cure them into a complex wing surface, for example. Alternatively, components may be constructed by chopping carbon fibers into shorter lengths and blending them with resins to produce a compound suitable for use in compression molding or resin-transfer molding.

CFRP laminate parts have been used in the manufacture of aircraft for several years. In one example, the 777 aircraft manufactured by Boeing uses CFRP for the passenger cabin floor beams, for the vertical and horizontal tails, and for aerodynamic fairings. Overall, CFRP-based components make up about 9% of the structural weight of this aircraft.

Composite components such as aircraft parts are often joined together or to other materials by fasteners. Processes used to join such components generally include the steps of drilling and countersinking a precision hole in the structures to be joined and then inserting a close-fitting fastener in a secure manner. Drilling of CFRP components is often difficult as a result of the highly abrasive nature of the material and has a tendency to delaminate and fray when processed using conventional drill bits. One of the more serious problems experienced in drilling CFRP occurs when the exit of the drill bit from the produced hole leaves uncut fibers exposed in the hole. Such fibers then may interfere with the proper fit of the fastener used to join the materials.

While many of the components lend themselves to being manufactured with NC or CNC drilling machines, there remains a portion of the holes in the structure that cannot be manufactured with such equipment and may require a hand held air drill motor to be used. Such drill motors are produced by companies such as Cooper Tools and are often used in conjunction with a hand held guide bushing.

When drilling holes with a hand drill in CFRP, the infeed of the drill bit into the material may be regulated by the operator who forces the drill bit into the material. Unfortunately, the drill bit may often surge at the point it exits the material on the backside, due to a lack of a controlled feed, resulting in uncut fibers. Even with considerable skill and experience, an unacceptable hole is often produced by this method.

The existing practice is to use a four flute straight flute drill bit design. (See FIG. 1). Such straight flute drill bits are often difficult to control at exit and in addition may produce a star shape hole as opposed to a round hole in the material. The uncut exit fibers combined with the star shaped hole may result in a less than optimum fit of the fastener in joining the materials.

Hole quality often has a direct bearing on the fatigue properties of the fastened joint. Such properties are documented by fatigue tests. Fatigue results for parts fastened with inferior hole quality. Such inferior hole quality often shows a marked reduction in fatigue life adversely affecting the suitability of the components in advanced aircraft structures.

As a result, it would be desirable to provide drill bits and methods of their use to produce cleaner holes with an improved roundness. Furthermore, it would be desirable to provide drill bits and methods of their use to produce holes using hand drill motors in advanced composite materials such as CFRP that improve the roundness of the hole and eliminate uncut fibers at the exit allowing for an improved fit between the fastener and the hole, thereby resulting in improved fatigue results for these joints.

SUMMARY OF THE INVENTION

In an embodiment, a drill bit for producing holes in composite materials is disclosed. The drill bit includes an elongate drill bit body having a drill bit diameter. The drill bit also includes at least two helical flutes. The helical flutes have a reverse helix angle and a primary cutting edge. The primary cutting edge has a positive rake angle. The drill bit further includes a point having a point length. The drill bit also includes a cutting tip with a tip angle and a tip length. The tip length is at least twice the drill bit diameter.

In another embodiment, a drill bit is disclosed. The drill bit has an elongate drill bit body with a drill bit diameter. The drill bit also has at least two helical flutes. The helical flutes have a reverse helix angle. The helical flutes also have a primary cutting edge with a positive rake angle. The drill bit has a point with a point length of approximately half the drill bit diameter. The drill bit also has a cutting tip with a tip angle and a tip length.

In a further embodiment, a drill bit for producing holes in composite materials is disclosed. The drill bit has an elongate drill bit body having a drill bit diameter. The drill bit also has at least two helical flutes. The helical flutes have a reverse helix angle of at least 0.5 degrees. The helical flutes also have a primary cutting edge with a positive rake angle. The drill bit includes a point having a point length of approximately half the drill bit diameter. The drill bit also includes a cutting tip with a tip angle of from approximately 17 degrees. The cutting tip has a tip length of at least twice the drill bit diameter.

The helical flutes, in some embodiments, have different helix angles. For example, in some embodiments, the helical flutes have a helix angle of at least 0.5 degrees. In other embodiments, the helical flutes have a helix angle of 0.5 to 10 degrees. In further embodiments, the helical flutes have a helix angle of 2 to 5 degrees.

In some embodiments, the cutting tip has a tip angle of from about 12 degrees to about 30 degrees, with a preferred angle of about 17 degrees. The point has a point length approximately half the drill bit diameter, in other embodiments.

The primary cutting edge, in some embodiments, has a positive rake angle of at least 6 degrees. In other embodiments, the primary cutting edge has a positive rake angle of at least 10 degrees. In further embodiments, the primary cutting edge has a hook geometry.

In alternative embodiments, the cutting edges may have a positive radial rake. In some embodiments, the radial rake is greater than 6 degrees. In other embodiments, the radial rake is greater than 10 degrees. In still other embodiments, the radial rake uses a hook geometry.

In some embodiments of the drill bit, the flute is a helical flute, which may include a reverse spiral. Some embodiments have a helical flute of at least 0.5 degrees, while other embodiments have a helical flute between 0.5 and 10 degrees. Still other embodiments have a helical flute between 2 and 5 degrees.

A method for using a drill bit is also disclosed. In many embodiments of the method a drill bit is provided that includes a shank with a receiving portion, a point portion, and at least one cutting edge. A material to be drilled is also provided in many embodiments. In one embodiment, a hand drill motor is provided, the drill bit is fixed in the hand drill motor, and the hand drill motor and drill bit are used to drill a hole in the material. In other embodiments, a mill, a lathe, a CNC mill, or a CNC lathe is provided. The drill bit is fixed in the drilling machine, and the drilling machine and drill bit are used to drill a hole in the material.

DETAILED DESCRIPTION

The embodiments of the present invention will be best understood by reference to the drawings. It will be readily understood that the components of the present invention, as generally described and illustrated in the figures herein, could be arranged and designed in a wide variety of different configurations. Thus, the following more detailed description of the embodiments of the drill bits of the present invention, as represented in FIGS. 3 through 7, is not intended to limit the scope of the invention, as claimed, but is merely representative of present embodiments of the invention. In order to illustrate a practical use of the drill bits of the present invention, the following description will illustrate the use of the drill bits in connection with advanced composite materials, such as CFRP. Of course, the drill bits of the present invention may be configured to drill materials such as wood, masonry, metals, and any other present or future materials.

Figure 1:
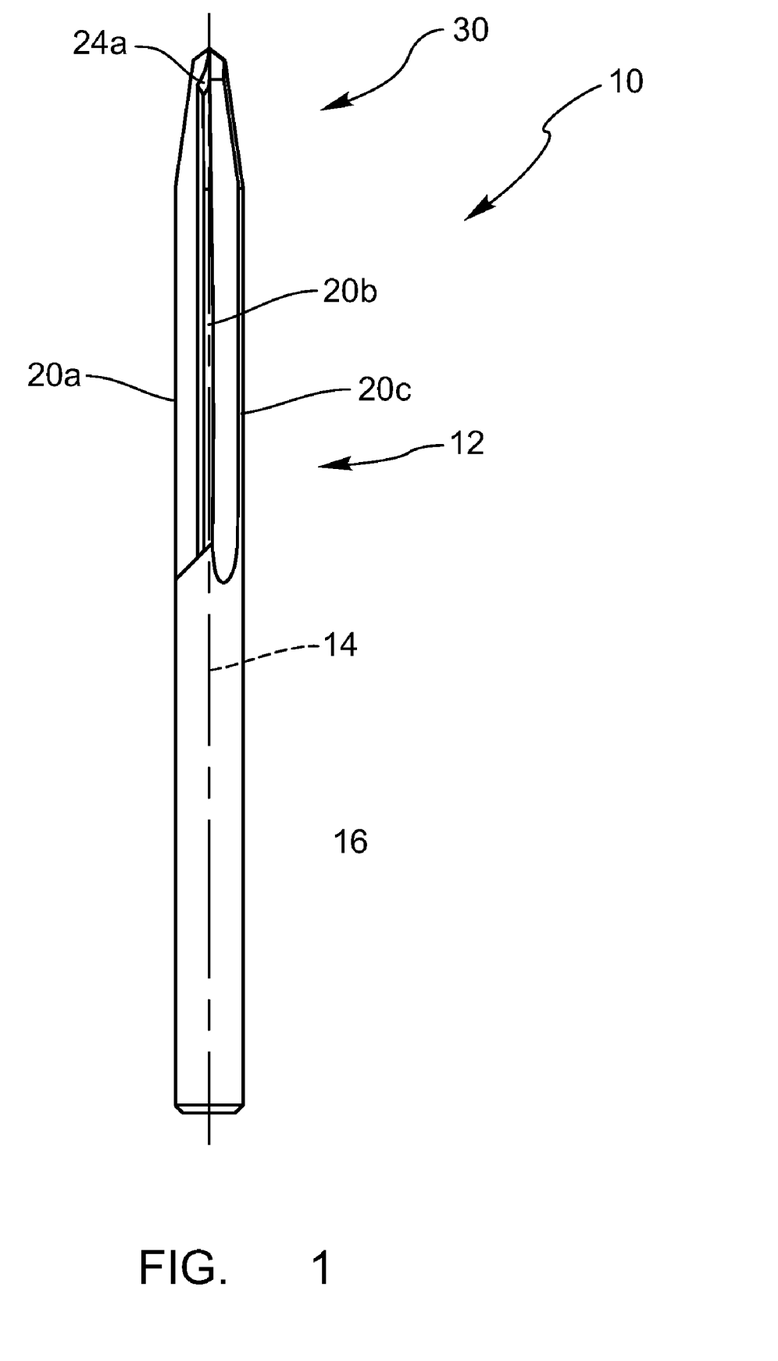
FIG. 1 is a side plan view of a drill bit representative of the current state of the art.

Referring first to FIG. 1, a side plan view of a prior art drill bit 10 configuration is shown. The drill bit 10 has an elongated cylindrical shaft 12 with a central longitudinal axis 14, and an outside diameter 16. The drill bit 10 has four symmetrical straight flutes 20a, 20b, 20c (the fourth flute is not shown in FIG. 1, but would be behind flute 20b) traveling a portion of the shaft 12. The flutes 20a, 20b, 20c terminate in a cutting tip 30. The intersection of the flutes 20a, 20b, 20c with the cutting tip 30 of the drill bit 10 does not create an axial rake face because the flutes 20a, 20b, 20c do not have a helix angle.

Figure 2:
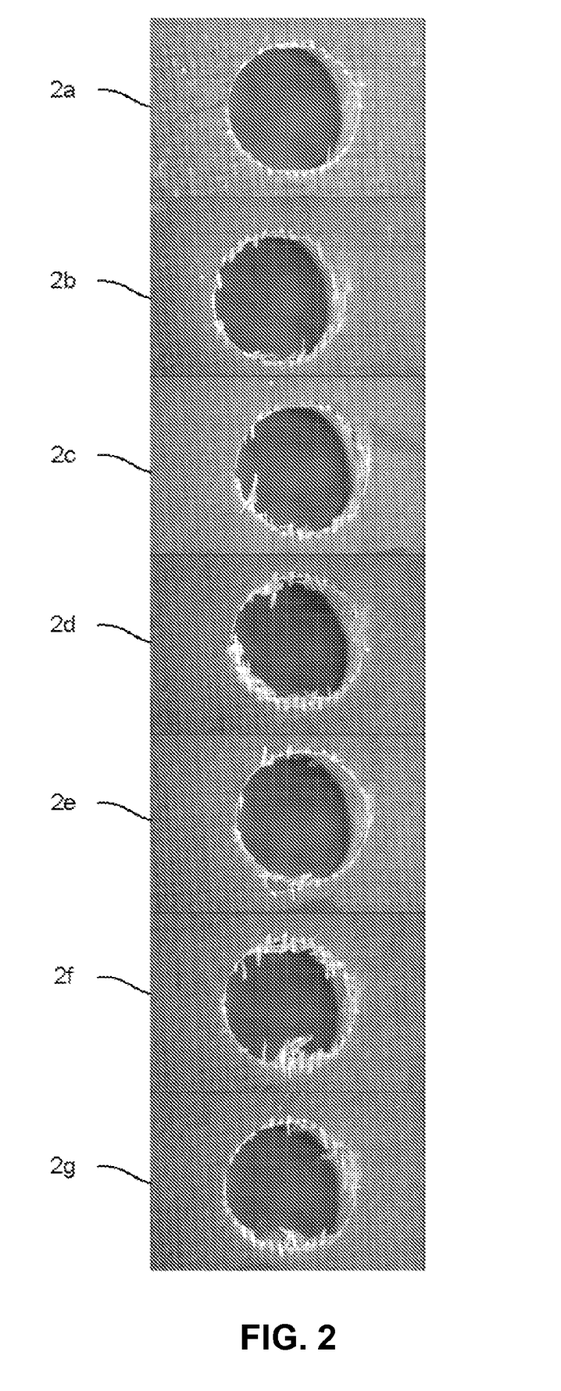
FIG. 2 is a photograph of a series of exit holes produced in a carbon fiber reinforced plastic composite laminate material using a tungsten carbide drill bit of the type shown in FIG. 1.
Figure 3:
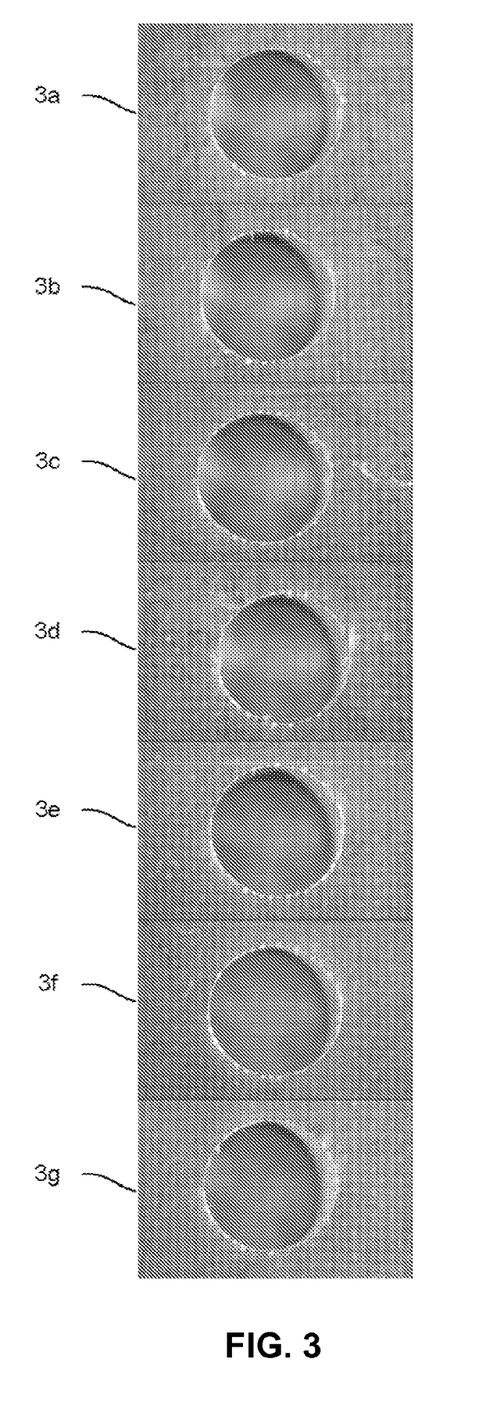
FIG. 3 is a photograph of a series of exit holes produced in a carbon fiber reinforced plastic composite laminate material using an embodiment of a tungsten carbide drill bit according to the present invention.

The apparatus and method of the present invention have been developed in response to the present state of the art, and in particular, in response to the problems and needs in the art that have not yet been fully solved by currently available drill bits and related hardware and methods used in drilling advanced composite materials such as CFRP by use of hand drill motors. The drill bit configurations of the invention provide unique drill bits that may produce close tolerance precision holes in advanced composite laminates with minimal delamination and clean exit holes. FIG. 2 shows the exit side of holes 2a, 2b, 2c, 2d, 2e, 2f, 2g produced by the present state of the art, while FIG. 3 shows the exit side of holes 3a, 3b, 3c, 3d, 3e, 3f, 3g produced by an embodiment of a drill bit made in accordance with the present invention.

Figure 4:
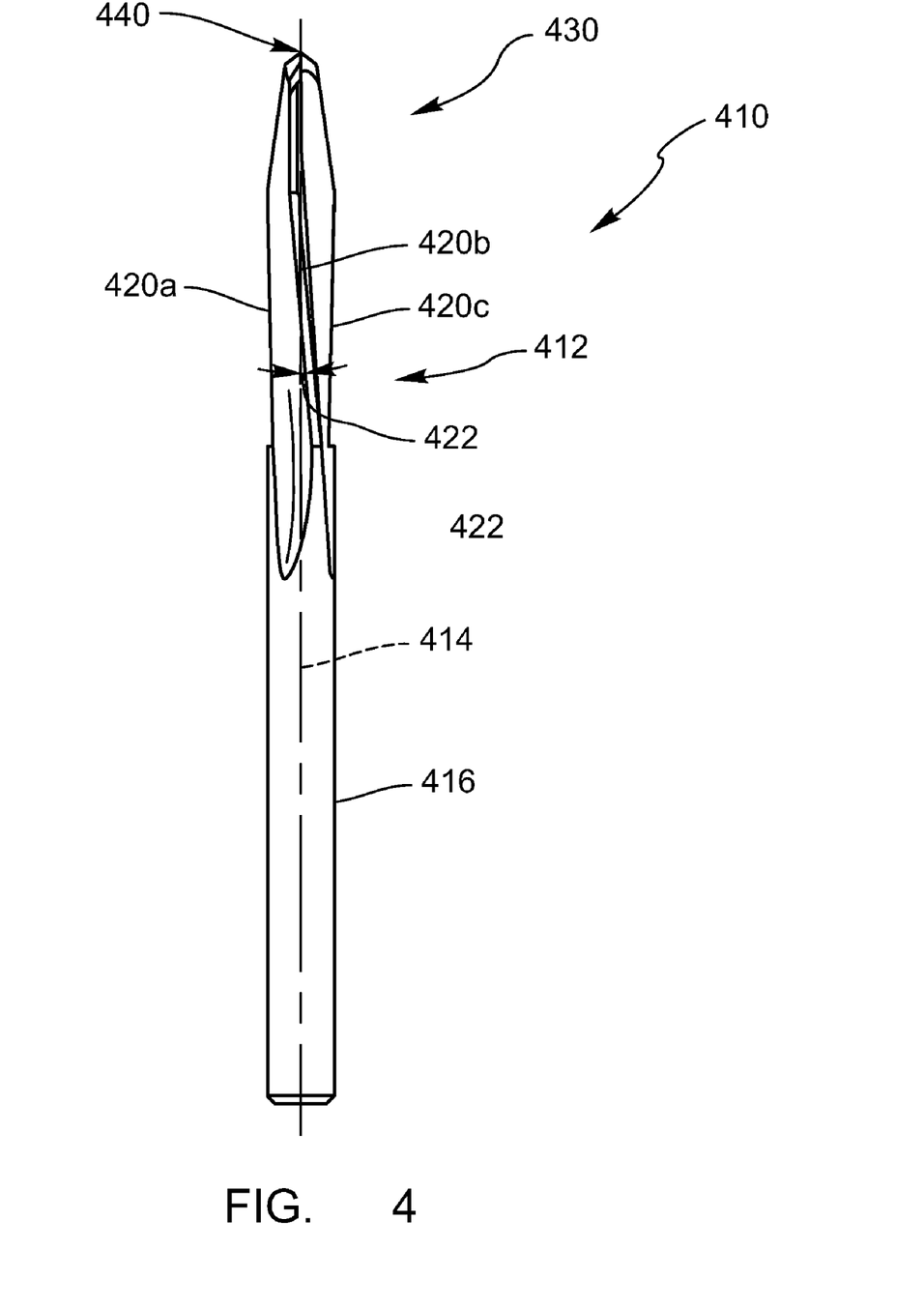
FIG. 4 is a side plan view of an embodiment of a drill bit according to the present invention.

As seen in the embodiment of FIG. 4, the drill bit 410 may combine four symmetrical left hand helical flutes 420a, 420b, 420c (the fourth flute is not shown in FIG. 4, but would be behind flute 420b) with a helix angle 424 of 0.5 to 10 degrees. The helical flutes 420a, 420b, 420c are blended into a long narrow cutting tip 430 with two of the flutes 420a, 420c reaching to the center to provide a faceted point 440. The drill bit 410 may have an elongated cylindrical shaft 412 with a central longitudinal axis 414, and an outside diameter 416. The helical flutes 420 have a helix angle 422 measured from the longitudinal axis 414.

Helical flutes may create a more stable contact of the drill bit with the hole wall avoiding the star pattern produced by non-helical drill bits. However, a conventional right hand helix may cause the drill bit to grab in the material at the exit and stop rotating. Such grabbing may be very dangerous to the wrist of the operator as the motor continues to apply a torque to rotate the drill bit and drill while at the same time the operator typically must suddenly counterbalance these forces when the drill bit grabs and binds in the material. Although it is often desirable to have a helical drill bit to create a round hole, this tendency to grab makes a drill bit with a right hand helix less desirable for many applications due to the difficulty it may cause the operator.

An embodiment of a drill bit 410 for drilling advanced composite laminates such as CFRP may be used with hand held drill motors without positive feed control. Hand drilling often presents unique challenges as the operator must regulate the advance of the drill bit 410 by the force he or she applies to the drill motor as the drill bit 410 is pressed against the material to be drilled. Although several embodiments of drill bits 410 according to the present invention have been designed for hand operation of a drill motor without feed control, this drill bit 410 may often be used in systems with feed control without any adverse performance. In fact, when some embodiments of the drill bit 410 are used with CNC equipment or positive feed control, the process may be more effective.

Figure 5:
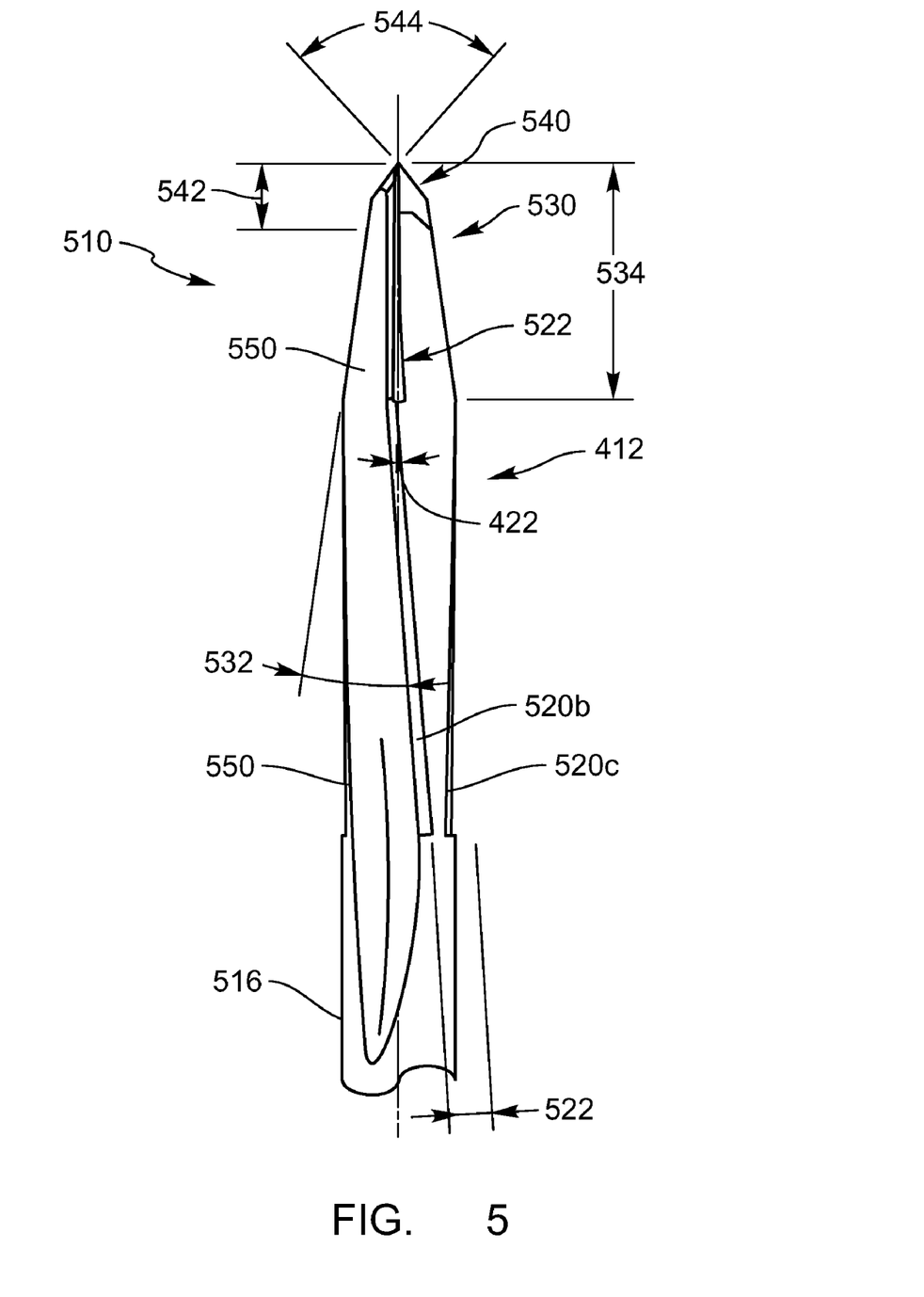
FIG. 5 is a detailed side plan view of an embodiment of the tip portion of a drill bit according to the present invention.

In one embodiment of the invention, the helical flutes 420a, 420b, 420c are reverse spiral or left hand flutes in the range of from 0.5 to 10 degrees. In other embodiments, the helical flutes 520a, 520b, 520c are reverse spiral or left hand flutes in the range of 2 to 5 degrees as shown in FIG. 5. The embodiment of FIG. 5 may counterbalance the thrust forces applied by the operator when drilling the hole thereby allowing the drill bit 510 to slowly exit the CFRP material and avoid the damage that often occurs with drill bits 10 of a straight flute design. Additionally, the drill bits 510 of this embodiment typically do not grab as with the conventional or right hand flute design, thereby eliminating many potential risks to the operator. Further, the holes produced by this embodiment of a drill bit 510 were typically found to be round and of good quality even with inexperienced operators.

The embodiment of a drill bit 510 of FIG. 5 is shown with four helical flutes 520a, 520b, 520c (the fourth flute is not shown in FIG. 4, but would be behind flute 520b) but other embodiments may use multi flute configurations such as two, three, four, five or six or more flutes 520. The present embodiment is shown with a very long narrow cutting tip 530 with an included tip angle 532 of about 17 degrees. In other embodiments, the included tip angle may range from about 12 to about 30 degrees. The cutting tip 530 has a tip length 534, which in some embodiments, is approximately two times the diameter 516 of the drill bit 510. The point 540 of the drill bit 510 may also be truncated with a point length 542 that makes up approximately one-half the diameter 516 of the drill bit 510. Typically a truncated point 540 may be finished with an approximately 118 degree point, but point angles 544 of larger and smaller angles may also be used. For example, the point 540 may be finished with a point of from about 90 degrees to about 135 degrees.

The embodiment of a drill bit 510 as shown in FIG. 5 with left hand helical flutes 520a, 520b, 520c has the cutting characteristics of a right hand drill bit. This may be accomplished by introducing 10 to 15 degrees of positive radial hook in the face 550 of the flute 520 where it intersects with the primary cutting edge 522 of the drill bit 510. The unique combination of grinds used to form this drill bit 510 may create a positive axial rake of 0.5 to 5 degrees. These positive rakes typically present a very sharp primary cutting edge 522 to the drill bit 510 to shear the fibers as the drill bit 510 exits the part.

A shorter cutting tip length 534 may delaminate the exit side layer of the composite materials. In order to prevent delamination, the cutting tip length 534 may be varied by changing the included tip angle 532 or the point angle 544.

The left hand or reverse helix angle 522 is used, in some embodiments, with a very modest angle of about 2 degrees, which may affect the way the drill bit 510 feeds into the material and may prevent the drill bit 510 from surging as the cutting tip 530 exits out the back side. In embodiments with a slight helix angle 522, the drill bit may create a finished hole that better approaches a true circle than a drill bit 10 without any flute angle.

Figure 6:
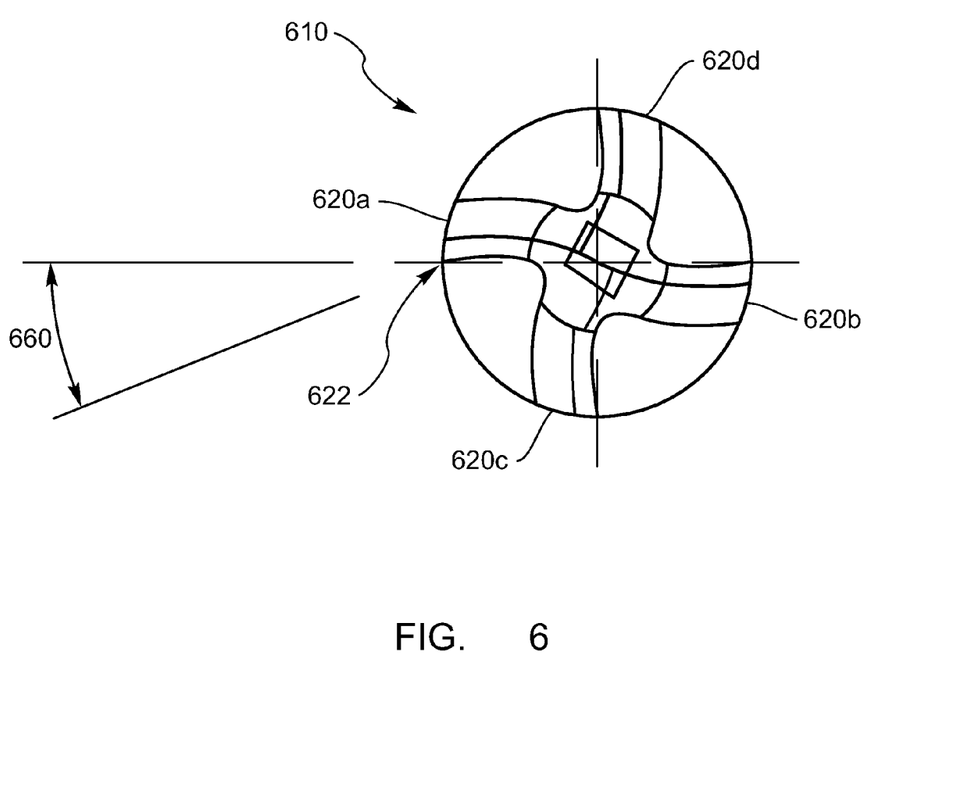
FIG. 6 is an end view of the tip of an embodiment of a drill bit according to the present invention.

FIG. 6 illustrates an embodiment of a drill bit 610 with a cutting angle 660 that uses a positive "hook" or radial rake. This feature in the drill bit 610 may allow the cutting edge 622 of the helical flutes 620 at the extreme outer diameter 616 of the drill bit 610 to engage the material with a very positive cutting angle 660 decreasing the cutting forces between the drill bit 610 and the wall of the material. In some embodiments, the cutting angle 660 is a hook that measures in excess of 6 degrees. In other embodiments, the cutting angle 660 is a hook that measures greater than 10 degrees, which may provide the shearing action needed to provide a clean cut to the material. Although other grinds may produce a positive radial rake 660 at this intersection, the use of a "hook" geometry, in some embodiments, may yield a stronger tool design than other geometries. The generation of a highly positive radial rake 660 and the exact geometry used to create that rake may be varied in some embodiments. The point configuration used in the embodiment of FIG. 6 may provide less delamination when drilling composite materials.

Figure 7:
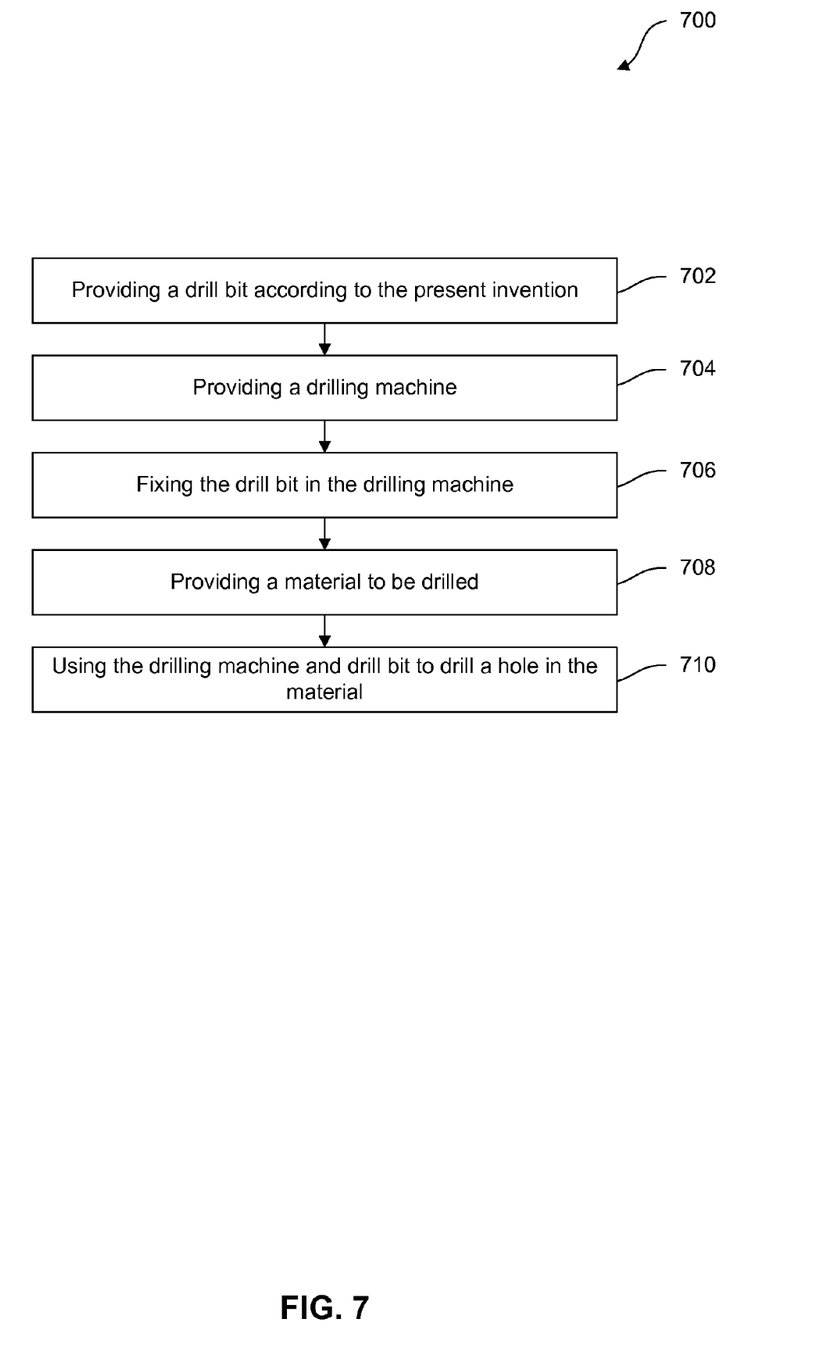
FIG. 7 is a flow diagram of a method for using an embodiment of a drill bit according to the present invention.

FIG. 7 is a flow diagram of an embodiment of a method 700 for using an embodiment of a drill bit of the present invention. A drill bit 410, 510, 610 of the present invention may be provided 702. A drilling machine may also be provided 704. A drilling machine may be a hand drill motor, a drill press, a mill, a lathe, an NC mill (including a CNC mill), an NC lathe (including a CNC lathe) or any other drilling machine that may be used to drill a hole. The drill bit 410, 510, 610 may be fixed 706 in the drilling machine. This may include inserting the drill bit 410, 510, 610 into the drilling machine and tightening a chuck or other mechanism for fixing a drill bit in a drilling machine.

A material to be drilled may also be provided 708. The material may be an advanced composite like those discussed above, or may be any material through which a hole may be desirably drilled, such as wood, metal, masonry, etc.

The drilling machine and drill bit 410, 510, 610 may be used 710 to drill a hole in the provided material. This may include fixing the material in a vise or jig in order to prevent the material from moving while drilling. In the case of an NC machine, this may include programming the NC machine to drill in desired locations. In the case of a hand drill motor, the user may hold the material in place by hand.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A drill bit for producing holes in composite materials comprising:
   an elongate drill bit body having a drill bit diameter;
   at least two helical flutes having:
      a reverse helix angle of about 0.5 to 10 degrees; and
      a primary cutting edge with a positive radial rake angle of at least 6 degrees;
   a point having a point length; and
   a cutting tip with a tip angle and a tip length of at least twice the drill bit diameter.

2. The drill bit of claim 1, wherein the helical flutes have a helix angle of about 2 to 5 degrees.

3. The drill bit of claim 1, wherein the cutting tip has a tip angle from about 12 to about 30 degrees.

4. The drill bit of claim 1, wherein the cutting tip has a tip angle of about 17 degrees.

5. The drill bit of claim 1, wherein the point length is approximately half the drill bit diameter.

6. The drill bit of claim 1, wherein the point angle is from about 90 to about 135 degrees.

7. The drill bit of claim 1, wherein the point angle is about 118 degrees.

8. The drill bit of claim 1, wherein the primary cutting edge has a hook geometry.

9. The drill bit of claim 1, wherein the drill bit is receivable in one of the following: a hand drill, a drill press, a mill, a lathe, a CNC mill, or a CNC lathe.

10. A drill bit comprising:
    an elongate drill bit body having a drill bit diameter;
    at least two helical flutes having:
        a reverse helix angle of 0.5 to 10 degrees; and
        a primary cutting edge with a positive radial rake angle of at least 6 degrees;
    a point having a point length of approximately half the drill bit diameter; and
    a cutting tip with a tip angle and a tip length.

11. The drill bit of claim 10, wherein the cutting tip has a tip length of at least twice the drill bit diameter.

12. The drill bit of claim 10, wherein the cutting tip has a tip angle of from about 12 to about 30 degrees.

13. The drill bit of claim 12, wherein the cutting tip has a tip angle of about 17 degrees.

14. The drill bit of claim 13, wherein the primary cutting edge has a hook geometry.

15. The drill bit of claim 14, wherein the point angle is from about 90 degrees to 135 degrees.

16. The drill bit of claim 15, wherein the point angle is 118 degrees.

17. The drill bit of claim 16, wherein the helical flutes have a helix angle of about 2 to 5 degrees.

18. The drill bit of claim 17, wherein the drill bit is receivable in one of the following: a hand drill, a drill press, a mill, a lathe, a CNC mill, or a CNC lathe.

19. A drill bit for producing holes in composite materials comprising:
    an elongate drill bit body having a drill bit diameter;
    at least two helical flutes having:
        a reverse helix angle of at least 0.5 degrees; and
        a primary cutting edge with a positive radial rake angle;
    a point having a point length of approximately half the drill bit diameter; and
    a cutting tip with a tip angle of approximately 17 degrees and a tip length of at least twice the drill bit diameter.

* * * * *